United States Patent
Ogale

(10) Patent No.: US 10,549,489 B2
(45) Date of Patent: Feb. 4, 2020

(54) PARTIAL CURING OF THERMOSET COMPOSITES

(71) Applicant: The Boeing Company, Chicago, IL (US)

(72) Inventor: Amol Ogale, Munich (DE)

(73) Assignee: The Boeing Company, Chicago, IL (US)

( * ) Notice: Subject to any disclaimer, the term of this patent is extended or adjusted under 35 U.S.C. 154(b) by 69 days.

(21) Appl. No.: 15/713,655

(22) Filed: Sep. 24, 2017

(65) Prior Publication Data

US 2019/0091947 A1 Mar. 28, 2019

(51) Int. Cl.
*B29C 70/30* (2006.01)
*C08J 5/04* (2006.01)
*B29K 101/10* (2006.01)

(52) U.S. Cl.
CPC .......... *B29C 70/30* (2013.01); *C08J 5/04* (2013.01); *B29K 2101/10* (2013.01)

(58) Field of Classification Search
CPC . B29C 66/71; B29C 66/7212; B29C 35/0266; B29C 65/02; B29C 65/4835; B29C 66/112; B29C 66/1122; B29C 66/12822; B29C 66/12842; B29C 66/131; B29C 66/43; B29C 66/524; B29C 66/532; B29C 66/5326; B29C 66/721; B29C 66/73751; B29C 66/73752; B29C 66/73754; B29C 66/73755; B29C 66/73941; B29C 70/30; B29C 73/10; B29K 2049/00; B29K 2063/00; B29K 2075/00; B29K 2307/04; B29K 2101/10; B29K 2105/24; B29L 2031/3076; C08J 5/04
See application file for complete search history.

(56) References Cited

U.S. PATENT DOCUMENTS

| | | | |
|---|---|---|---|
| 2,606,880 | A | 8/1952 | Yourtee |
| 5,176,949 | A | 1/1993 | Allagnat et al. |
| 6,284,089 | B1 | 9/2001 | Anderson et al. |
| 8,307,872 | B2 | 11/2012 | Kendall et al. |
| 8,834,668 | B2 | 9/2014 | Nelson et al. |
| 9,731,453 | B2 | 8/2017 | Humfeld et al. |
| 2002/0038687 | A1 | 4/2002 | Anderson et al. |
| 2008/0011377 | A1 | 1/2008 | Van Hooren et al. |
| 2009/0148647 | A1 | 6/2009 | Jones et al. |
| 2010/0116938 | A1 | 5/2010 | Kline et al. |

(Continued)

FOREIGN PATENT DOCUMENTS

| | | |
|---|---|---|
| EP | 2808157 A1 | 3/2014 |
| WO | WO2009153271 A1 | 12/2009 |

(Continued)

OTHER PUBLICATIONS

European Patent Office Extended Search Report, dated Mar. 11, 2019, regarding Application No. 18193550.3, 8 pages.

*Primary Examiner* — Frances Tischler
(74) *Attorney, Agent, or Firm* — Yee & Associates, P.C.

(57) ABSTRACT

Composite laminate structures are produced using partially cured parts. Partial curing of the parts is achieved by applying a catalyst to regions of the parts that are to be fully cured. These regions cure at a lower-than-normal temperature while remaining regions of the part remain uncured, allowing them to be co-bonded or co-cured to other structures.

17 Claims, 10 Drawing Sheets

FIG. 10

(56) References Cited

U.S. PATENT DOCUMENTS

2010/0124659 A1\* 5/2010 Nelson ................ B29C 35/0266
                                                          428/411.1
2011/0198020 A1   8/2011 Marengo et al.
2018/0290339 A1\* 10/2018 Nguyen .................... B32B 5/28

FOREIGN PATENT DOCUMENTS

WO    WO-2017055920 A1 \*  4/2017  ............... B32B 5/28
WO    WO2017055920 A1     4/2017

\* cited by examiner

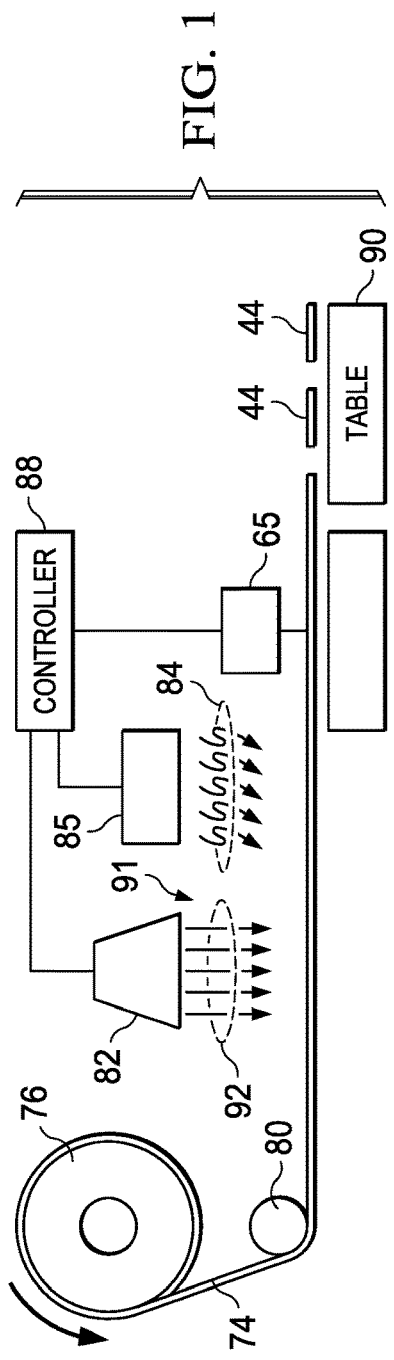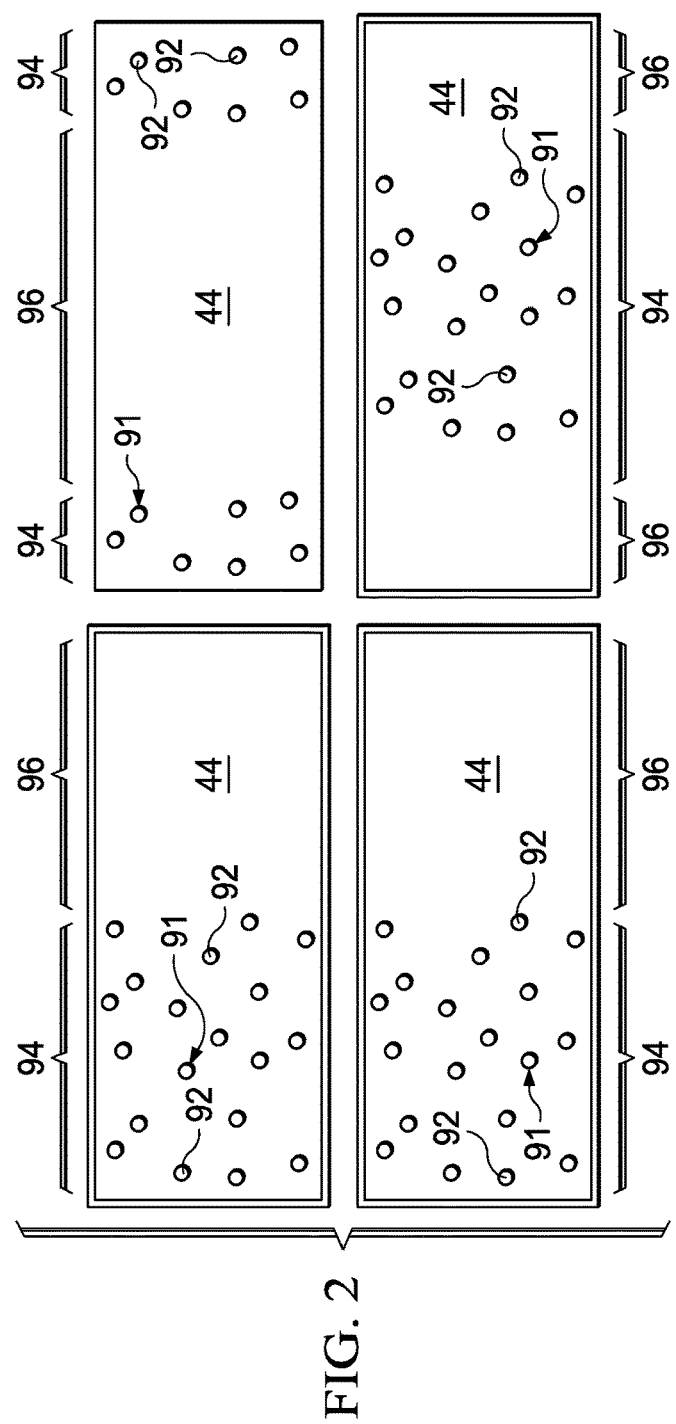

000# PARTIAL CURING OF THERMOSET COMPOSITES

BACKGROUND INFORMATION

1. Field

The present disclosure generally relates to the fabrication of composite structures, and deals more particularly utilizing partially cured composite laminate parts.

2. Background

Composite laminate parts may be joined together by adhesive bonding, co-bonding or co-curing. In the case of adhesive bonding and co-bonding, at least one of the parts requires adequate surface preparation and proper adhesive selection in order to achieve the desired bonding quality. The need for surface preparation and elimination of surface contaminants increases manufacturing costs, and the use of bonding adhesives adds undesired weight to part assemblies. Manufacturing costs are also increased by the need to provide tooling for supporting the uncured parts during the joining process. These issues reduce the options available for efficient staging of manufacturing processes. It would therefore be desirable to provide more alternatives for assembly, joining and/or curing, and process sequencing.

Therefore, it would be desirable to have a method and apparatus that take into account at least some of the issues discussed above, as well as other possible issues.

SUMMARY

The disclosure relates in general to manufacturing composite parts, and more specifically to joining composite laminate thermoset parts that are partially cured. A resin curing accelerator in the form of a catalyst is applied to portions of part layups that are to be precured. The catalyst accelerates curing of these portions at low cure temperatures, while leaving other portions of the parts uncured and therefore chemically reactive. Uncured portions of the parts can be brought into contact with each other and co-cured, while the cured portions of the parts provide the parts with stability. The catalyst can be strategically applied to certain regions of one or more plies before they are laid up, resulting in a part that has tailored curing.

According to one aspect, a method is provided of making a composite structure. The method comprises assembling a layup, including laying up a plurality of plies of fiber reinforced thermoset resin, and applying a resin curing reaction accelerator to a first portion of the layup. The method further comprises curing the first portion of the layup using a cure schedule that is sufficient to cure the first portion of the layup while maintaining a second uncured portion of the layup uncured.

According to another aspect, a method is provided of making a composite structure. The method comprises applying a resin curing accelerator to selected regions of fiber reinforced, thermoset resin plies, and assembling a layup including the thermoset resin plies to which the resin curing accelerator has been applied. The method further includes forming the layup to a desired shape, and producing a partially cured part by curing the selected regions of the thermoset plies having the resin curing accelerator applied thereto, while leaving other regions of the layup uncured. The method also includes placing the partially cured layup against a structure, and joining the partially cured part to the structure.

According to still another aspect, a composite laminate part layup is provided, comprising a plurality of fiber reinforced, thermoset resin plies, wherein at least certain of the thermoset resin plies have a resin curing accelerator applied to at least a region thereof.

One of the advantages of the disclosed embodiments is that the need for extensive surface preparation and bonding adhesives of parts to be joined may be eliminated. Another advantage is that tooling costs required for maintaining part shapes can be substantially reduced or eliminated. A further advantage is that specialized equipment is not required to achieve differential heating/cooling of different portions of the parts. Partial curing of parts can be performed using conventional equipment. Still another advantage is that partially cured composite laminate parts can be produced in which cured portions of parts support and maintain the shape of the uncured portions without the need for underlying support tooling or fixtures.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a diagrammatic view of an apparatus and method for producing composite plies having an acceleration catalyst strategically applied to selected regions of thereof.

FIG. 2 is an illustration of a plan view of several composite plies showing the regions to which the catalyst has been applied using the apparatus and method shown in FIG. 1.

DETAILED DESCRIPTION

Figure 3:
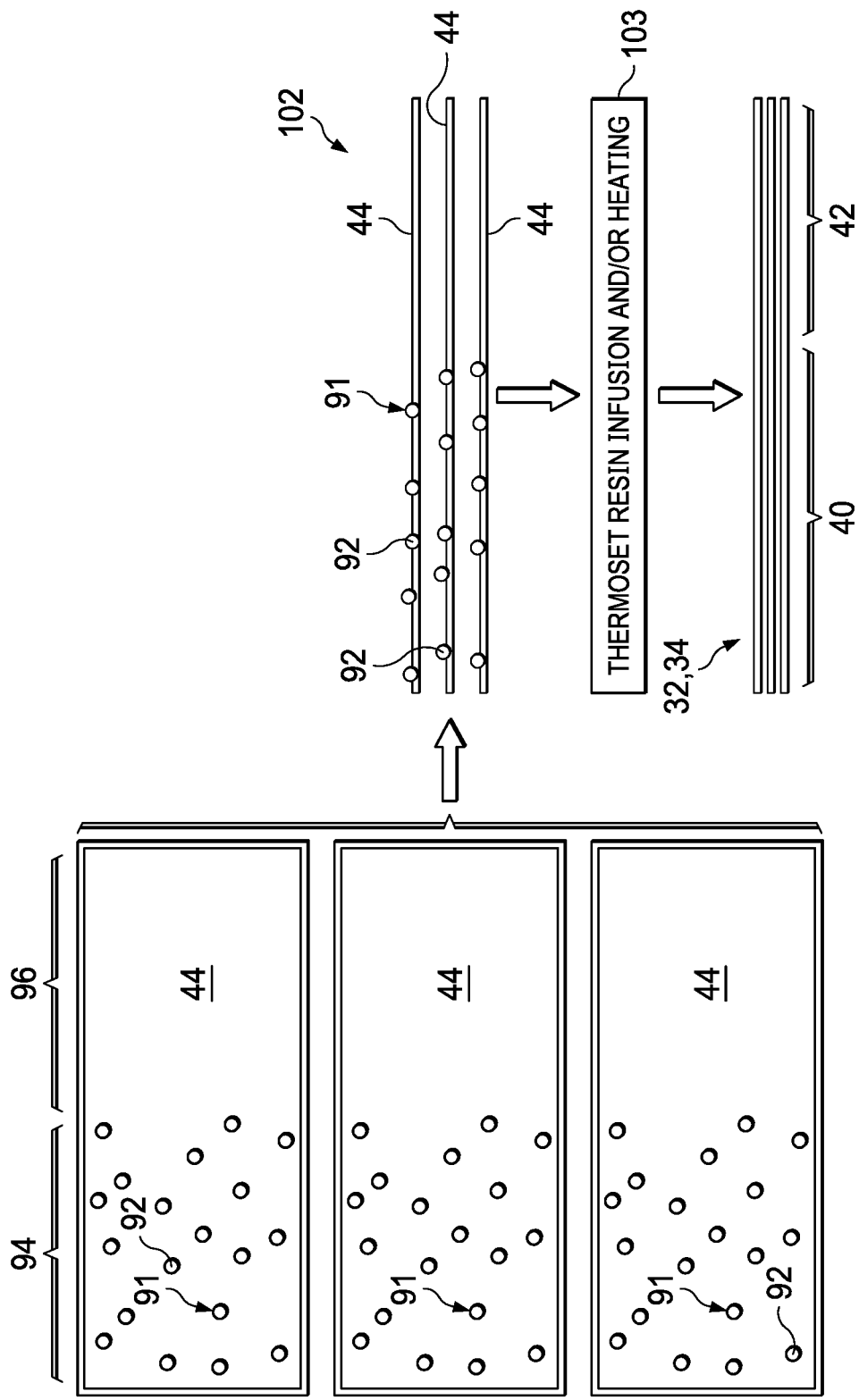
FIG. 3 is an illustration of a diagrammatic view showing how plies with a strategically applied catalyst are processed to form a partially cured composite laminate part.

Attention is now directed to FIGS. 1 and 2 which diagrammatically illustrate an apparatus and method for strategically applying a resin curing accelerator 91 to selected regions of the plies 44 that allows partially cured parts 32, 34 to be produced having cured and uncured portions 40, 42 (FIG. 3) respectively. The resin curing accelerator 91 comprises a reaction catalyst 92 that causes the resin to which it is applied to cure at a temperature lower than the normal cure temperature and/or more quickly, compared to regions of the plies 44 to which the catalyst has not been applied. In other words, strategic application of the catalyst 92 to regions 94 of the plies 44 allows differential curing of the parts 32, 34.

Sheet material 74, which may comprise either a prepreg or dry fibers, is drawn from a bulk supply reel 76 and guided through one or more rollers 80 past a catalyst applicator 82. The catalyst applicator 82, which in the illustrated example is an automated applicator operated in accordance with a set of programmed instructions accessed by a programmed controller 88, applies a suitable reaction catalyst 92 to preselected regions 94 of the sheet material 74, either by spraying, printing or using other techniques. The catalyst 92 is strategically applied to preselected regions of the plies 44 that are intended to be precured. Optionally, following the application of the catalyst 92, a catalyst stabilizer 84 may be applied to the catalyst 92 by a stabilizer applicator 85 in order to stabilize the catalyst 92. The catalyst stabilizer 84 functions to prevent potential degradation of the catalyst 92. Sheet material 74 is then cut to the desired ply lengths by a ply cutter 65 before being delivered onto a table 90 or other support where they may be picked up manually or by a pick-and-place machine (not shown) to form a ply layup.

Figure 11:
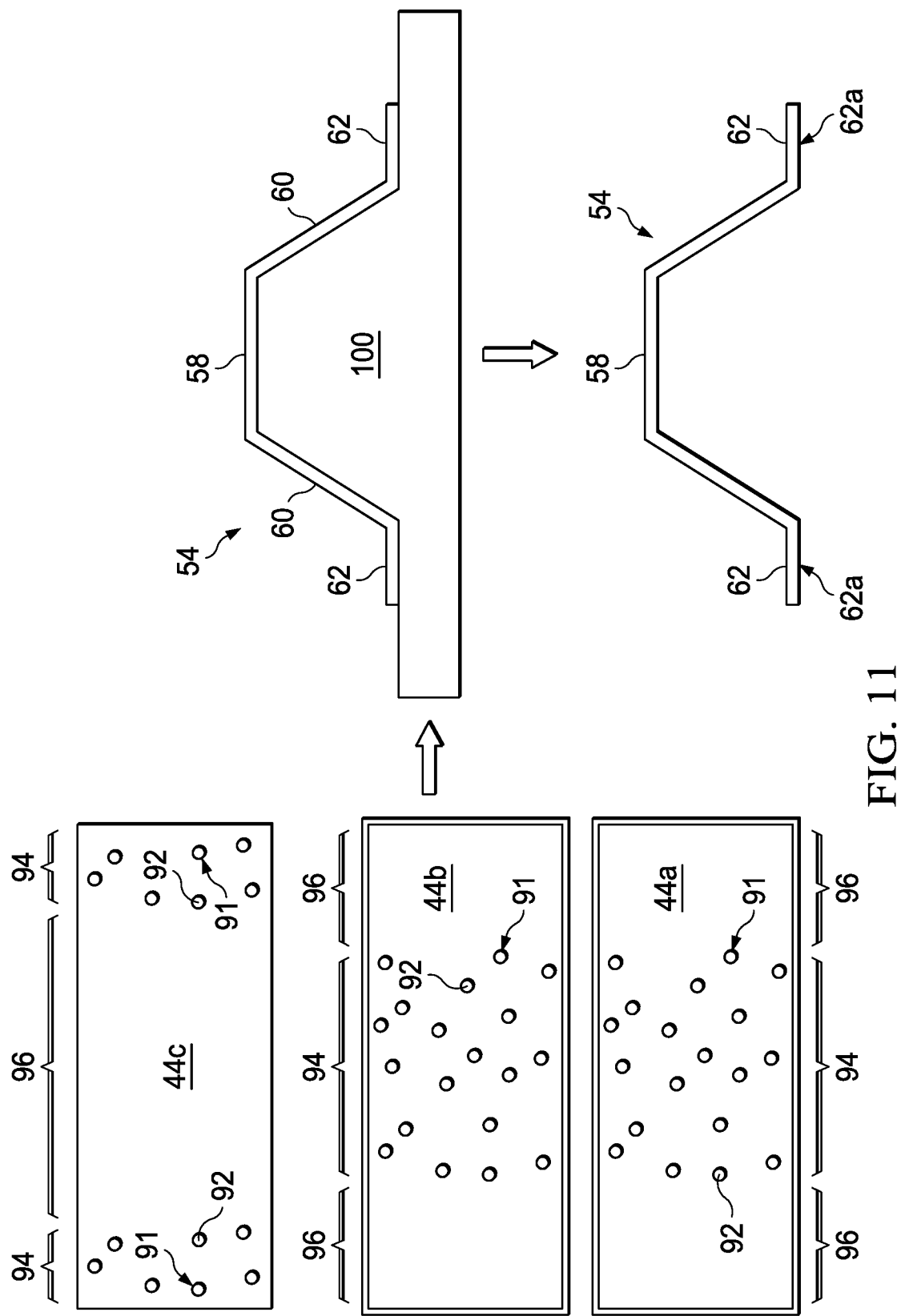
FIG. 11 is an illustration showing how plies having the catalyst strategically applied to certain regions thereof are used to form a hat stringer having uncured portions that can be co-cured or co-bonded to the composite skin shown in FIG. 9.

While a largely automated process for strategic application of the catalyst 92 to selected regions of plies has been described, a primarily manual process is possible. For example, plies 44 can be cut from bulk prepreg material, and the catalyst 92 can then be applied by hand to the desired regions of the plies 44 using spraying, brushing or other manual techniques, following which the plies 44 can be manually stacked according to a desired ply schedule. Alternatively, the plies 44 can be manually transported and laid up by hand on a layup tool (not shown) that is used to shape the plies 44 prior to precuring in which the regions of the plies 44 having the catalyst 92 applied thereto are cured at a temperature lower than the normal cure temperature. Alternately, the catalyst 92 may be applied, either manually or under automatic control, to the individual plies 44 after the ply 44 is placed on the layup tool 100 (FIG. 11).

FIG. 2 illustrates four typical plies 44 showing the catalyst 92 having been strategically applied only to certain regions 94 of the plies 44 that are intended to be precured, while leaving the remaining regions 96 intended to remain uncured devoid of the catalyst 92.

Attention is now directed to FIG. 3 which illustrates how the acceleration catalyst 92 can be strategically applied to plies 44 of either thermoset prepreg or dry fiber that is later impregnated with a thermoset resin to form a differentially cured part 32, 34 having cured and uncured portions 40, 42 respectively. The thermoset resin may comprise, for example and without limitation, epoxy resins, cynate ester resins, polyurethane resins, or phenolic resins. The catalyst 92 should be suitable for the selected thermoset resin. For example, 4,4 0-methylene-bis 3-chloro-2,6-Diethylaniline can be used as the catalyst for cynate ester resins. In this example, the catalyst 92 is applied on the left half of the plies 44, following which the plies 44 are stacked to form a ply layup 102. At 103, the layup 102 is heated according to a cure schedule that is sufficient to substantially cure the regions 94 that are to be precured but is insufficient to cure the remaining regions 96 that are to remain uncured and therefore chemically active. In the case of dry fiber plies 44, the plies 44 are infused with a thermoset resin, and then heated to a temperature that is sufficient to cure those regions 94 of the plies 44 to which the catalyst 92 has been applied.

From the foregoing, it can be appreciated that differential curing of the parts 32, 34 can be achieved using to different cure schedules. For example, the first cure schedule used to achieve partial curing of the part 32, 34 may be performed at a lower temperature and/or shorter duration, compared to a second cure schedule that is used to fully cure the part 32, 34, during co-curing or co-bonding with another structure. In the case of epoxy resin, for example and without limitation, the first cure schedule may include heating the layup of parts 32, 34 to a temperature of approximately 140° C., while second cure schedule may heating the parts 32, 34 to a temperature higher than 140° C. Once the part 32, 34 is bought into contact with another part 32, 34, the two parts 32, 34 may be co-cured or co-bonded according to a cure schedule, as described above, that is different than the cure schedule used to partially cure the part 32, 34.

Figure 4:
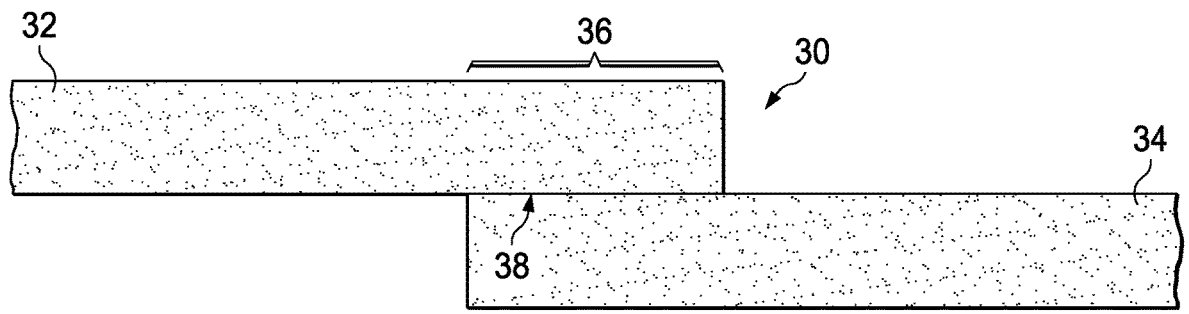
FIG. 4 is an illustration of a side view of a composite laminate structure formed by two parts joined together along an interfacial region, wherein the parts have plies that are partially precured using a cure accelerator.

Referring first to FIG. 4, a composite structure 30 comprises two composite laminate parts 32, 34 joined together along an overlapping area 36 at an interfacial region 38 forming a lap joint. The parts 32, 34 shown in FIG. 1 are joined together along an interfacial region 38 either by co-bonding or co-curing. As will be discussed below in more detail, prior to being fully cured as shown in FIG. 1, at least one of the parts 32, 34 is in a partially cured state, and includes an uncured portion (FIG. 2) along the interfacial region 38 that is achieved by differential curing of the part 32, 34, using the strategic application of a resin curing accelerator 91 (FIG. 2) to the piles of the part 32, 34 in the form of a reaction catalyst 92 (FIG. 11).

Figure 5:
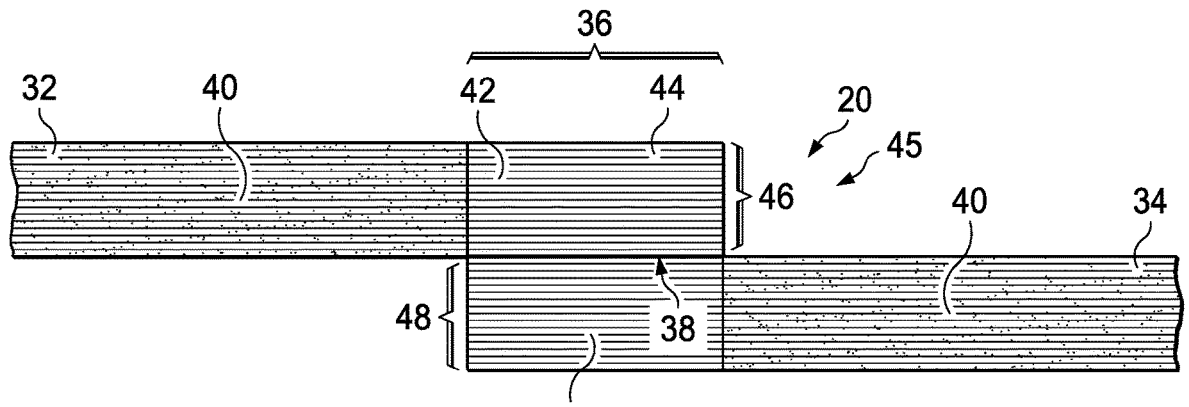
FIG. 5 is an illustration similar to FIG. 4, prior to full curing, wherein each of the parts has a cured portion and an uncured portion.

FIG. 5 illustrates one example of the composite structure 30 shown in FIG. 4 in which the two parts 32, 34 are joined together in the overlapping area 36 to form a lap joint 45, by co-curing the two parts 32, 34. In this example, each the parts 32, 34 includes a cured portion 40 and an uncured portion 42. As used herein, "cured portion" means that the cured portion has been cured to a degree that maintains the shape and stability of the part 32, 34. In some applications, the cured portion 40 may be fully cured, while in other applications, the cured portion 40 may be cured to a greater degree than the uncured portion 42, but nevertheless cured to a point that maintains the overall shape and stability of the part 32, 34. Also, as used herein, "uncured portion" means that the uncured portion remains chemically reactive and capable of being co-cured with another uncured part or bonding adhesive. While in the illustrated examples, the parts 32, 34 are substantially flat, in other examples, the parts 32, 34 may have three dimensional curves or complex contours resulting from at least partial curing of the parts 32, 34 in shaped tooling (not shown) suitable for the application. As will be discussed below, precuring regions of the parts 32, 34 having the resin curing accelerator 91 applied thereto results in a partially cured part 32, 34 that maintains the shape imparted to it by the tooling, in spite of the fact that other regions of the part 32, 34 remain uncured. The ability of the partially cured part to maintain its shape allows the part to be handled, transported and/or joined to a structure by co-bonding or co-curing, without the need for supporting tooling or fixtures.

In the example shown in FIG. 5, the plies 44 of the parts 32, 34 throughout their thicknesses 46, 48 within the overlapping area 36 are uncured prior to being joined together and co-cured. The portions 40 of the plies 44 outside of the overlapping area 36 are precured prior to the joining process as a result of a curing accelerator 91 (see FIG. 1) having been applied thereto which allows these portions 40 to be precured at a temperature lower than normal cure temperature, while maintaining other portions 42 uncured. The uncured portions 42 of the parts 32, 34 that overlap each other have been brought into contact with each other along an interfacial region 38. When subjected to a full cure process explained later, the uncured portions 42 of the two parts 32, 34 are co-cured, joining them together along the interfacial region 38.

Figure 6:
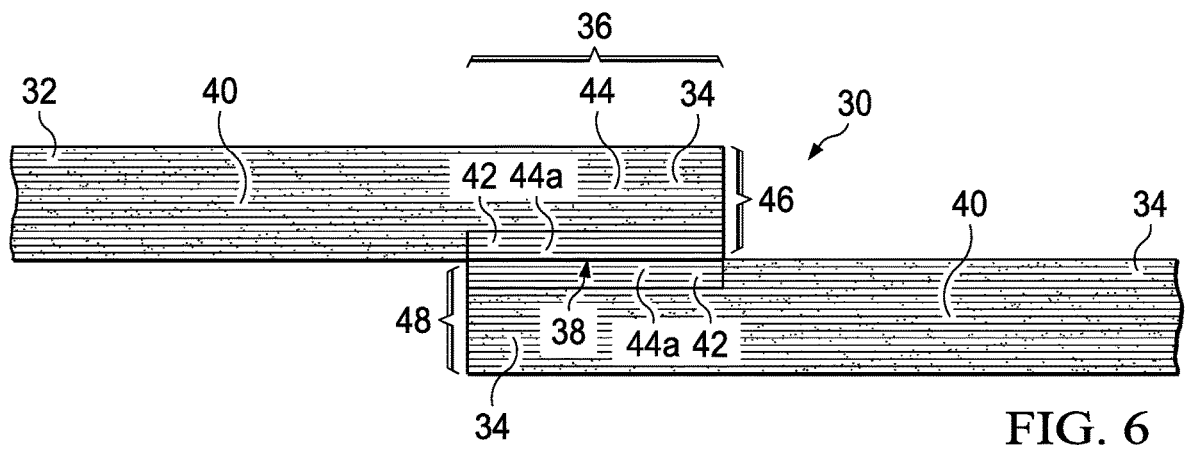
FIG. 6 is an illustration similar to FIG. 5 but wherein only certain plies of the parts near the interfacial region are uncured.

Referring now to FIG. 6, in this embodiment, only a few of the plies 44a within the thicknesses 46, 48 immediately adjacent to the interfacial region 38 within the overlapping area 36 are uncured. The cured portions 40 may be cured at a lower-than-normal cure temperature due to the resin curing accelerator 91 having been applied thereto, while those plies 44a along the interfacial region which do not have an application of the resin curing accelerator 91 remain uncured. From the foregoing, it may be appreciated that strategic application of the resin curing accelerator 91 allows pre-curing of any selected region e.g. overlapping area 36 of any ply 44 within the thickness 46, 48 of the part 32, 34, while the remaining plies 44a within the same region remain uncured. Thus, it is apparent that the two parts 32, 34 may be joined together by co-curing only a few of the uncured plies 44a along the interfacial region 38, while the cured portions that have been precured using the resin curing accelerator 91 maintain the shapes of the parts 32, 34 throughout their lengths. The cured portions 40, which are aligned with and positioned above the uncured portions 40, therefore provide stability and support for the uncured portions 40, without the need for supporting tooling.

Figure 7:
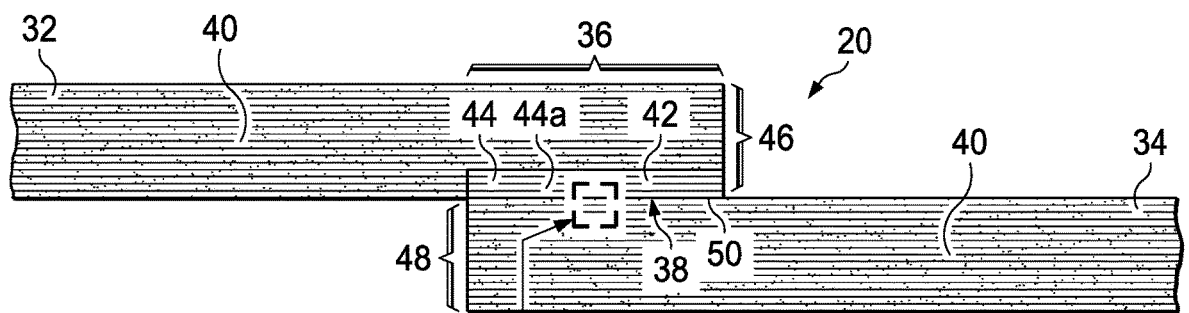
FIG. 7 is an illustration similar to FIG. 6, but wherein only the plies of one of the parts near the interfacial region are uncured, and the parts are joined together along an adhesive bondline.
Figure 8:
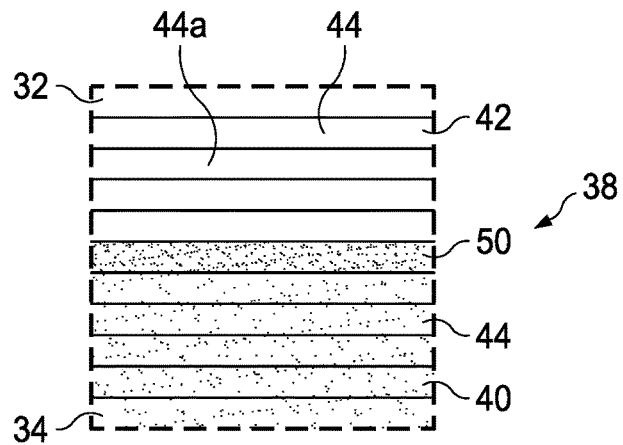
FIG. 8 is an illustration of the area designated as "FIG. 8" in FIG. 7.

FIGS. 7 and 8 illustrate another embodiment in which the two parts 32, 34 are joined together along an adhesive bondline 50 by co-bonding. In this example, an uncured portion 42 of part 32 comprising several uncured plies 44a along the interfacial region 38 are bonded to part 34 of which all plies 44 have been precured. The regions of the plies 44 that are stacked above the uncured plies 44a have had the resin curing accelerator 91 applied thereto, allowing them to be precured at a temperature that is lower than the normal cure temperature of the thermoset resin. Once the bonding adhesive is applied to one or both of the parts 32, 34, the two parts 32, 34 can be assembled and subjected to a full cure schedule, thereby cocuring the uncured plies of part 32 with the adhesive along the adhesive bondline 50.

Figure 9:
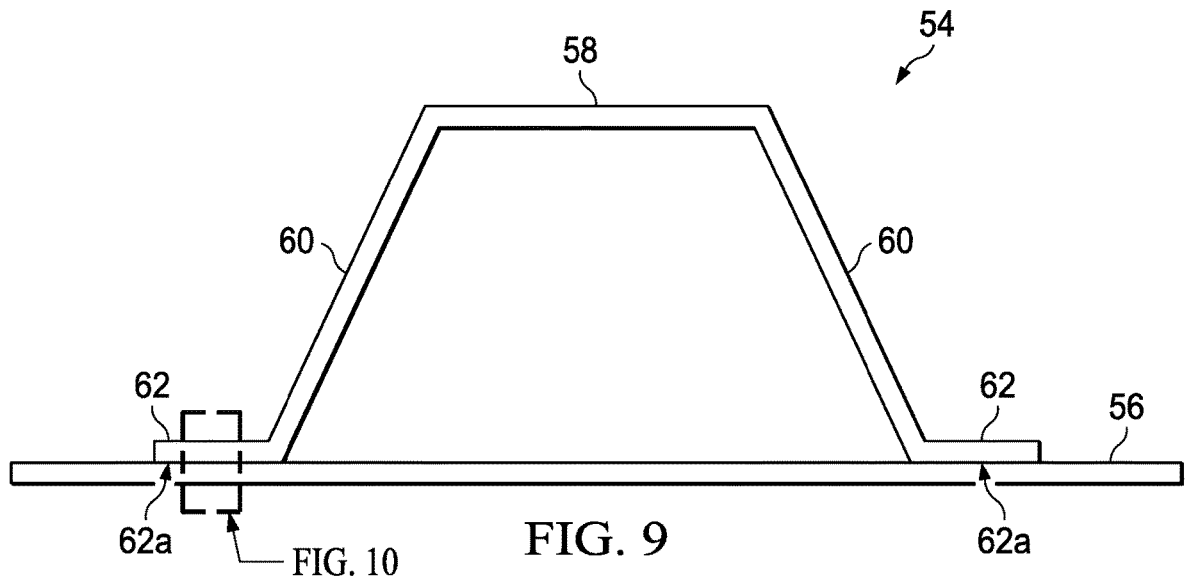
FIG. 9 is an illustration of a cross-sectional view of a hat stringer joined to a composite skin.
Figure 10:
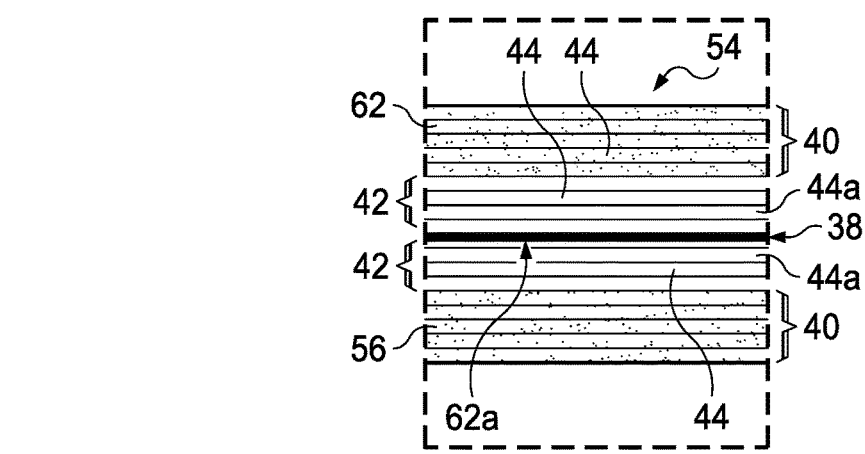
FIG. 10 is an illustration of the area designated as "FIG. 10" in FIG. 9.

Attention is now directed to FIGS. 9 and 10 which illustrate a composite laminate hat stringer 54 that is joined to a composite laminate skin 56. The hat stringer comprises a top 58, webs 60 and outwardly extending flanges 62. The hat stringer 54 includes a cured portion 40, and an uncured portion 42 comprising uncured plies 44a on the bottoms 62a of the flanges 62. As best seen in FIG. 7, those plies 44 near the top of flanges 62 have been precured at a lower than normal cure temperature according to a first cure schedule as a result of having the resin curing accelerator 91 applied thereto, while the plies 44 near the interfacial region 38 at the bottom 62a that do not have an applied resin curing accelerator 91, remain uncured and are subsequently cured at the higher, normal cure temperature of the resin according to a second cure schedule. The composite skin 56 is also a partially cured structure having cured portions 40 and uncured portions 42. The uncured portions 42 of the skin 56 are located along the interfacial region 38, facing the uncured portions 42 of the flanges 62. In this example, the bottoms 62a of flanges 62 are cocured to the uncured portion 42 of the skin 56. In other examples, the skin 56 may be fully cured, in which case the uncured plies 44a on the bottoms 62a of the flanges 62 may be co-bonded to the skin 56.

Reference is now made to FIG. 11 which illustrates how the partially cured hat stringer 54 of FIG. 9 can be produced using the process shown in FIG. 1 to strategically apply the catalyst 92 to regions 94 of the plies 44 that are to be precured, while leaving other regions 96 uncured. A top plan view on the left side of FIG. 11 depicts three plies 44a, 44b, 44c to which the catalyst 92 has been strategically applied. Only three plies are shown for sake of simplicity of description however in practical applications a typical hat stringer 54 may comprise a greater number of plies 44. In this example, ply 44a is a bottom ply, 44c is a top ply and ply 44b is an intermediate ply positioned between plies 44a and 44c. Catalyst 92 is applied only to the central region 94 of plies 44a and 44b which correspond to the top 58 and webs 60 of the stringer 54. The catalyst 92 is also applied only to the regions 94 at the left and right edges of ply 44c which correspond to the flanges 62.

The plies 44a, 44b and 44c are laid up on a suitable tool 100 having a cross-sectional shape corresponding to a completed stringer 54. In one example, the plies 44a, 44b, 44c are laid up flat as a stack, and the stack is transferred onto the tool 100 where it is formed down onto, heated and consolidated using autoclave or out of autoclave processing. In another example, the plies 44a, 44b, 44c and the individually laid up and formed down onto the tool 100. The ply layup on the tool 100 is then heated and consolidated in an autoclave, pressclave or oven, according to a first cure schedule that is sufficient to cure those regions 94 that are to be precured, i.e., those portions of the plies 44a, 44b, 44c that are to be precured. Following this initial curing process, the formed and stiffened shape of the partially cured hat stringer 54 is maintained as a result of the stiffness of the precured regions 94, while the uncured regions 96 of the bottom and intermediate plies 44a, 44b remain uncured and therefore chemically reactive.

Following the forming and pre-curing process described above, the stringer 54 is removed from the tool 100 and transferred to the skin 56 (FIG. 9) where the bottoms 62a of flanges 62 are brought into contact and placed against the skin 56. The bottoms 62a of the flanges 62 can be co-cured or co-bonded with the composite skin 56 or other composite structure, using a second cure schedule. Curing according the second cure schedule results in full curing of the bottoms 62a of the flanges 62 as well as adhesive that may be used to cobond the stringer 54 and the skin 56. Although not shown in the Figures, it may be possible to tack certain of the plies 44 together by applying the catalyst 92 to regions of the plies 44 that are to be tacked together. Using this technique, certain of the plies 44 may be tacked together, while other uncured plies 44 are allowed to slip relative to the other plies 44 during the forming.

Figure 12:
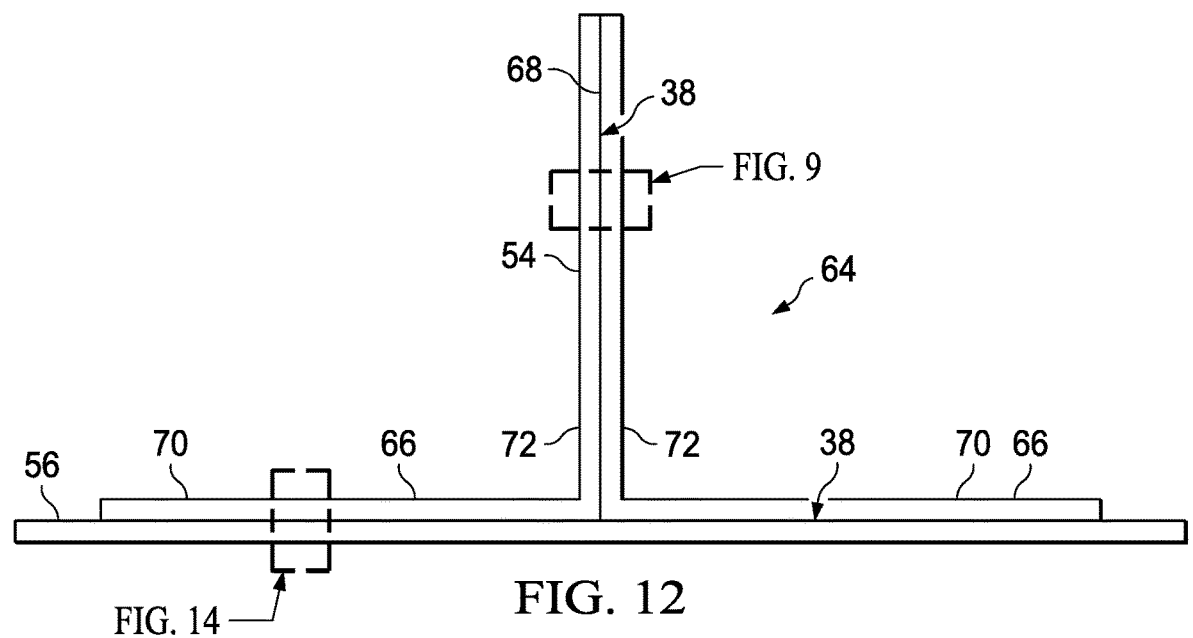
FIG. 12 is an illustration of a cross-sectional view of a partially cured blade stringer ready to be joined to a composite skin.
Figure 13:
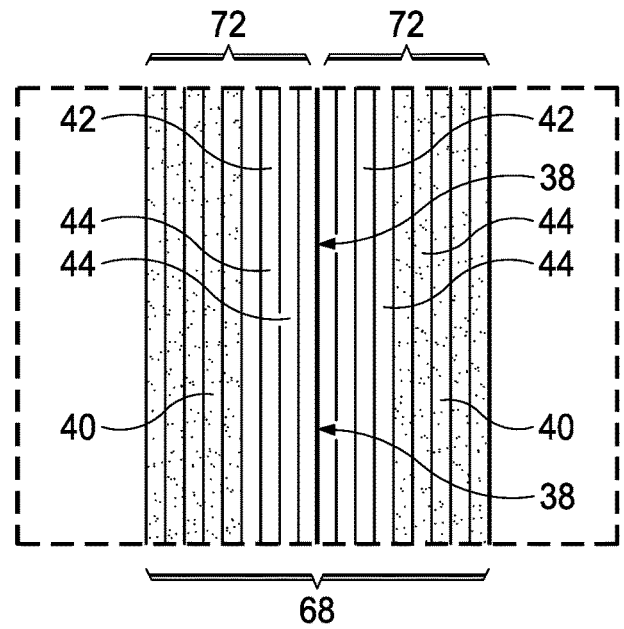
FIG. 13 illustration of the area designated as "FIG. 13" FIG. 12.
Figure 14:
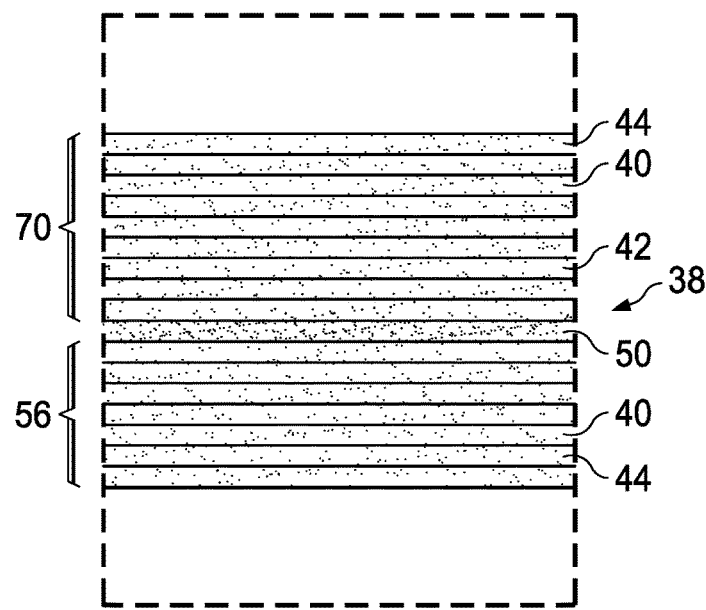
FIG. 14 is an illustration of the area designated as "FIG. 14" in FIG. 12.

Referring now to FIGS. 12, 13 and 14, a blade stringer 64 comprises a blade 68 and a pair of flanges 69 joined to a composite skin 56. The blade stringer 64 includes a pair of L-shaped members 66 joined together to form a preassembled part before being joined to the skin 56. Each of the L-shaped members 66 includes a flange section 70 and a blade section 72. Each of the blade sections 72 includes uncured portions 42 along an interfacial region 38 between the two blade sections 72. More particularly, the uncured portions 42 of the two blade sections 72 are joined together by co-curing. Referring particularly to FIGS. 8 and 10, the uncured portions 42a of the flange sections 70 comprise uncured plies 42 along the interfacial region 38 that are co-bonded to the fully cured plies 44 of the skin 56 along an adhesive bondline 50.

Thus, from the foregoing, it can be appreciated that the L-shaped members 66 each comprise cured and uncured portions 40, 42 and are joined together by co-curing, while the flanges sections 70 are joined to the skin 56 by co-bonding. As in previous examples discussed above, cured and uncured portions 40, 42 are achieved by strategic application of a resin curing accelerator 91 to only selected regions of selected plies 44 that are to be precured. A two-step curing process is then used in which regions of the plies 44 having the resin curing accelerator are cured at a lower-than-normal cure temperature, and the remaining uncured regions of the plies 44 without the curing accelerator 91 are subsequently cured at the normal, full cure temperature.

The plies 44a, 44b and 44c are laid up on a suitable tool 100 having a cross-sectional shape corresponding to a completed stringer 54. The ply layup is then heated to a temperature that is sufficient to cure those regions 94 that are to be precured, i.e., those portions of the plies 44a, 44b, 44c that are to be precured. Following this initial curing process, the formed shape of the partially cured hat stringer 54 is maintained as a result of the stiffness and rigidity of the precured regions 94, while the uncured regions 96 of the bottom and intermediate plies 44a, 44b remain uncured and chemically reactive. Consequently the bottoms 62a of the flanges 62 can be co-cured or co-bonded with an underlying composite part, such as a composite skin 56 (not shown in FIG. 14).

Figure 15:
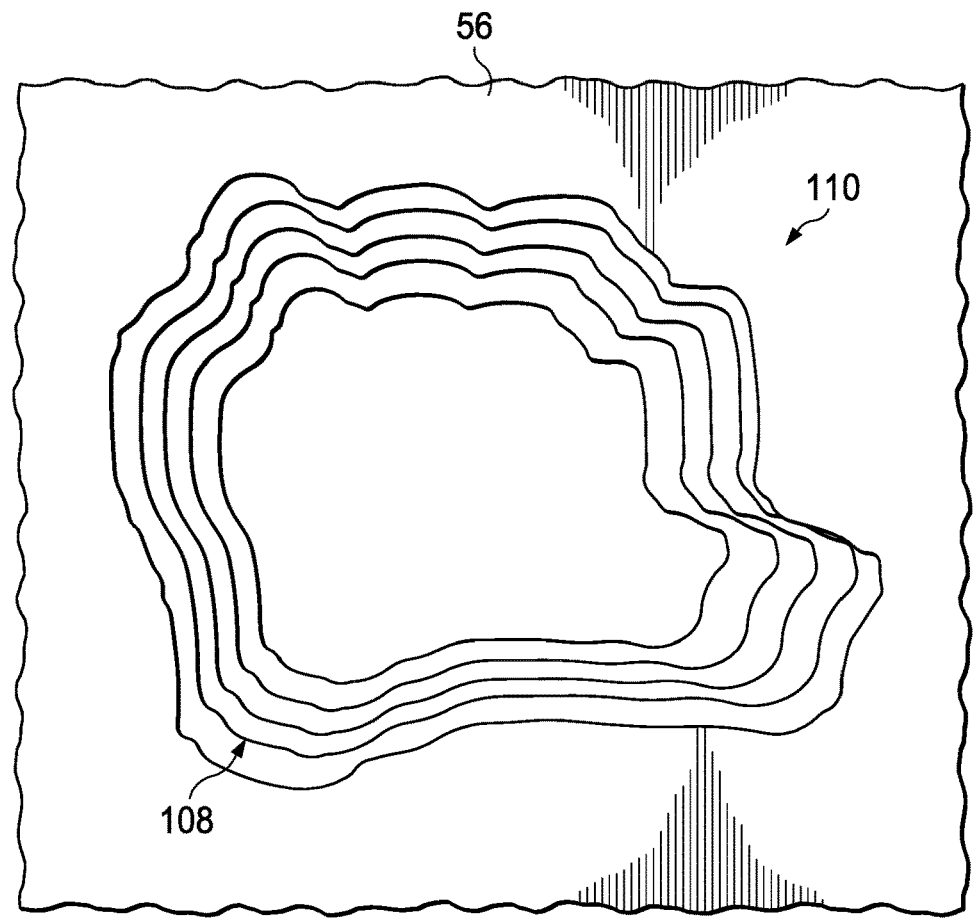
FIG. 15 is an illustration of a plan view of an aircraft skin having a scarfed area requiring rework.
Figure 16:
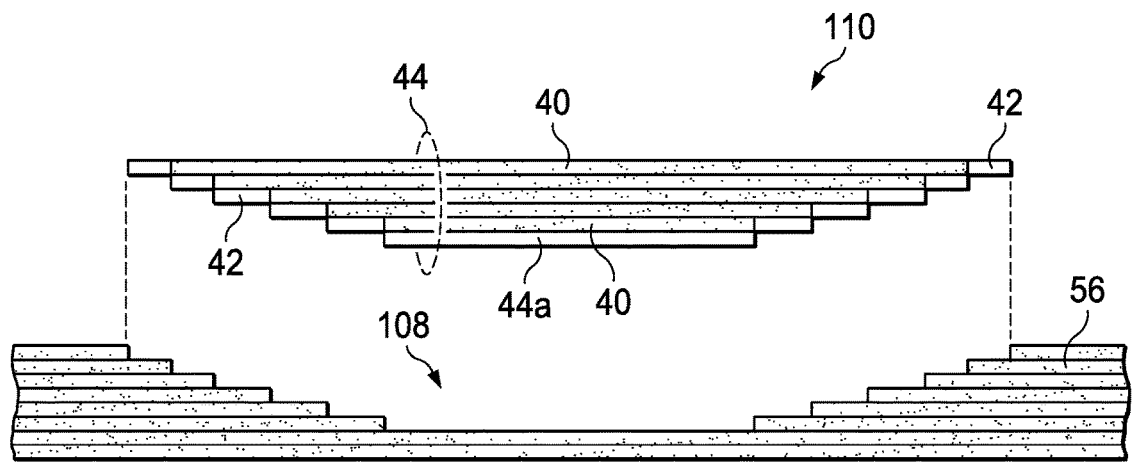
FIG. 16 is an illustration of a sectional view of the scarfed area shown in FIG. 15, also showing a partially cured rework patch about to be applied thereto.

FIGS. 15 and 16 illustrate the use of the acceleration catalyst 92 to produce a partially cured composite laminate patch 110 that may be used in the field to rework a composite skin 56 of an aircraft. The composite skin 56 has a scarfed depression within the area requiring rework. The patch 110 comprises a plurality of composite plies 44, at least certain of which are partially precured. In the illustrated example, the outer extremities of a number of the plies 44 comprise uncured portions 42 while the remainder of those plies comprise cured portions 40. The bottom ply 44a of the patch 110 remains entirely uncured. In this example, it can be appreciated that the entire area of the patch 110 that is to be joined to the skin 56 is uncured. The uncured portions 42 of the patch 110 are co-bonded to the cured skin 56 using a suitable bonding adhesive. Following placement of the patch 110 on the skin 56, the patch 110 is heated to a temperature sufficient to fully cure the uncured portions 42. The uncured portions 42 are supported by the rigid cured portions 40.

Figure 17:
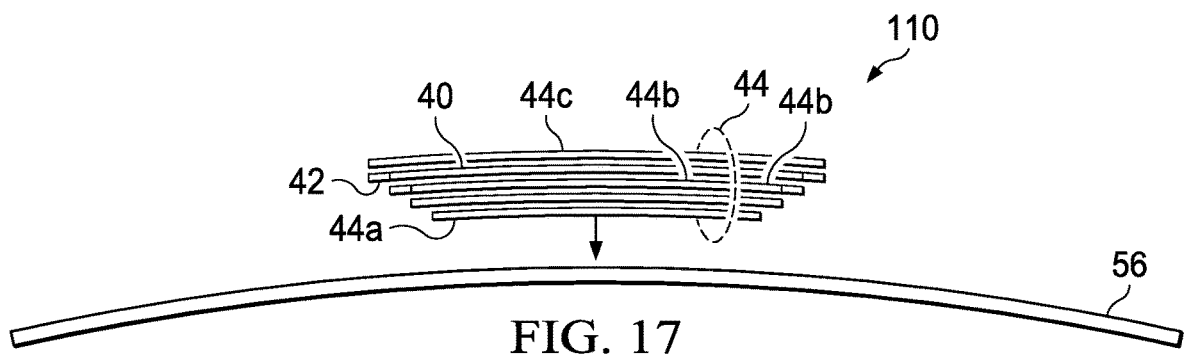
FIG. 17 is an illustration of a cross-sectional view of an aircraft skin having a partially cured rework patch positioned to be applied thereto, the plies of the patch being exploded to better reveal the cured and uncured portions thereof.

FIG. 17 illustrates a partially cured rework patch 110 that can be applied to the surface of the skin 56 that is not scarfed. In this example, the partially cured patch 110 includes two bottom plies 44a that are entirely uncured, two intermediate plies 44b that are partially cured, and a top ply 44c that is fully cured. The fully cured and partially cured plies 44a, 44b respectively maintain the shape and stability of the rework patch 110 even though the patch 110 includes uncured portions 40.

Figure 18:
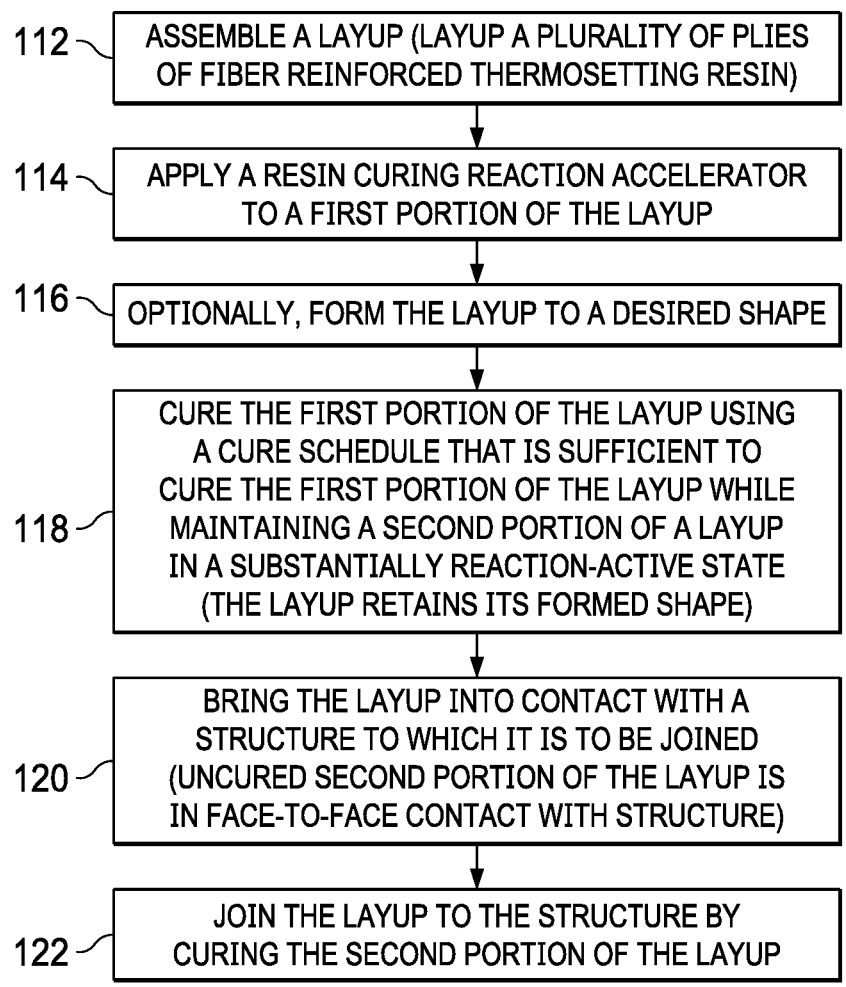
FIG. 18 is an illustration of a flow diagram of a method of joining composite parts.

Attention is now directed to FIGS. 18 which broadly illustrates the steps of a method of fabricating a composite structure using partially cured parts. At 112, a composite ply layup is assembled comprising either dry fiber plies which are later infused with a thermoset resin, or by laying up a plurality of prepreg plies. The method includes ordering the plies 44 such that regions of plies that remain uncured are located along an interfacial region 38. At 114, a catalyst 92 which functions as a resin curing accelerator 91 is applied to a first portion of the layup. At 116, optionally, the layup is formed to a desired shape. At 118, the first portion of the layup is cured using a cure schedule that is sufficient to cure the first portion of the layup while maintaining a second portion of the layup uncured, i.e. in a substantially reaction-active state. The cured portions of the layup maintain the shape of the layup without the need for tooling. In those applications where the layup has been formed against tooling during precuring, the precured part is removed from the tooling and transported to a structure to which it is to be joined. At 120, the layup is brought into contact with a structure to which it is to be joined, in which the uncured second portions of the layup are placed in face-to-face contact with a structure which may be cured or uncured. At 122, the layup is joined to the structure by curing the second portion of the layup.

Figure 19:
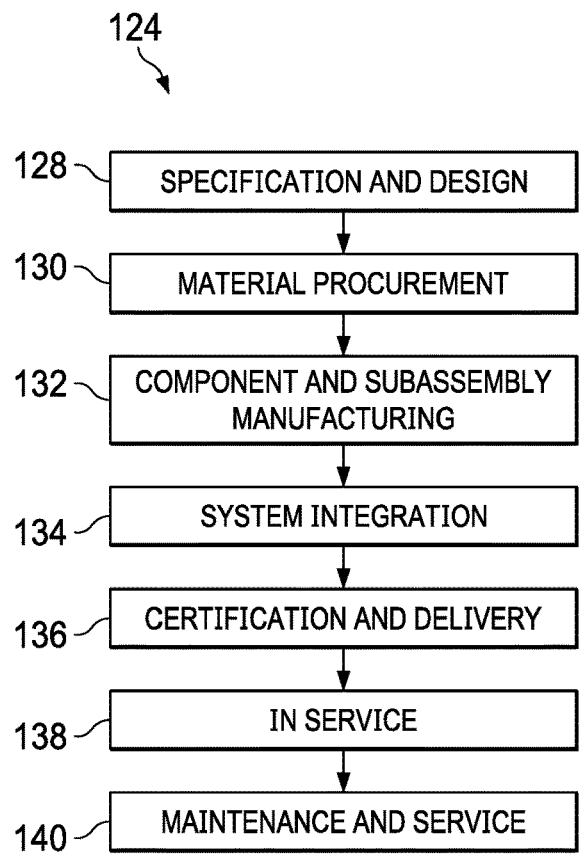
FIG. 19 is an illustration of a flow diagram of aircraft production and service methodology.
Figure 20:
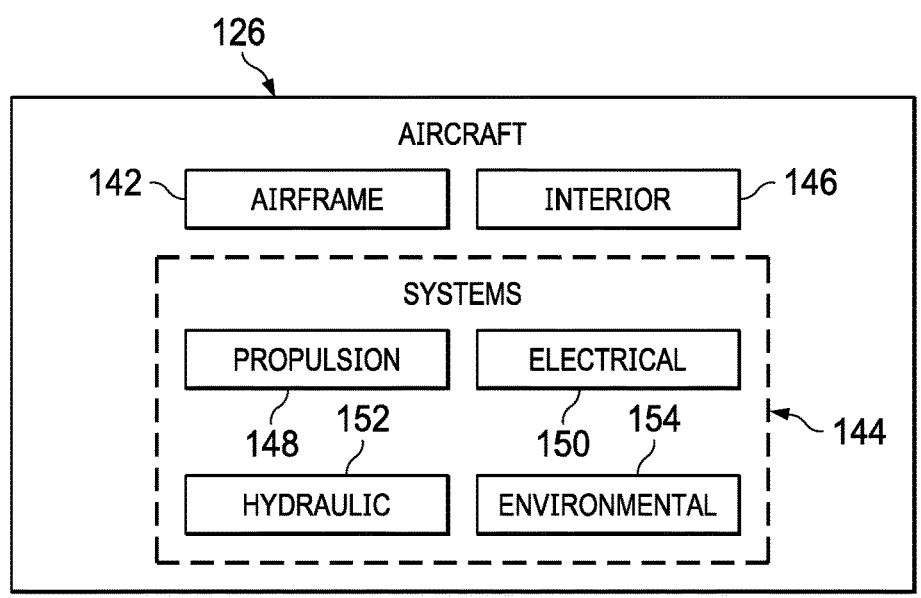
FIG. 20 is an illustration of a block diagram of an aircraft.

Embodiments of the disclosure may find use in a variety of potential applications, particularly in the transportation industry, including for example, aerospace, marine, automotive applications and other application where pressurized fluid tubes, such as fuel systems and hydraulic systems in aircraft, may be used. Thus, referring now to FIGS. 19 and 20, embodiments of the disclosure may be used in the context of an aircraft manufacturing and service method 124 as shown in FIG. 19 and an aircraft 126 as shown in FIG. 20. Aircraft applications of the disclosed embodiments may include, for example, without limitation, a wide array of composite laminate parts that are joined together to form a structure. During pre-production, exemplary method 124 may include specification and design 128 of the aircraft 126 and material procurement 130. During production, component and subassembly manufacturing 132 and system integration 134 of the aircraft 126 takes place. Thereafter, the aircraft 126 may go through certification and delivery 136 in order to be placed in service 138. While in service by a customer, the aircraft 126 is scheduled for routine maintenance and service 140, which may also include modification, reconfiguration, refurbishment, and so on. The disclosed embodiments may be utilized in any one or more of steps 132, 134, 140, 142 and 146.

Each of the processes of method 124 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 126 produced by exemplary method 124 may include an airframe 142 with a plurality of systems 144 and an interior 146. Examples of high-level systems 144 include one or more of a propulsion system 148, an electrical system 150, a hydraulic system 152 and an environmental system 154. Any number of other systems may be included. Although an aerospace example is shown, the principles of the disclosure may be applied to other industries, such as the marine and automotive industries.

Systems and methods embodied herein may be employed during any one or more of the stages of the production and service method 124. For example, components or subassemblies corresponding to production process 132 may be fabricated or manufactured in a manner similar to components or subassemblies produced while the aircraft 126 is in service. Also, one or more apparatus embodiments, method embodiments, or a combination thereof may be utilized during the production stages 132 and 134, for example, by substantially expediting assembly of or reducing the cost of an aircraft 116. Similarly, one or more of apparatus embodiments, method embodiments, or a combination thereof may be utilized while the aircraft 126 is in service, for example and without limitation, to maintenance and service 140.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of making a composite structure, comprising:
    assembling a layup, including laying up a plurality of plies comprising a resin, via:
        applying a resin curing accelerator to a first portion of at least a first ply within the plurality of plies within the layup; and
        applying additional resin curing accelerator to a second portion of at least a second ply within the plurality of plies within the layup, the first portion of the first ply being separated from the second portion of the second ply by a third ply in the plurality of plies within the layup;
    supporting the layup with tooling;
    curing the first portion and the second portion of the layup in a curing tool and using a cure schedule for curing the first portion and the second portion of the layup while maintaining an uncured portion in an interfacial region of the layup uncured;
    removing the layup from the tooling;
    subsequent to removing the layup from the tooling, aligning the layup adjacent to a composite piece of a composite structure; and
    simultaneously curing the uncured portion of the layup and joining the layup to the composite piece of the composite structure.

2. The method of claim 1, further comprising:
    curing the uncured portion of the layup according to a cure schedule different from the cure schedule used to cure the first portion of the first ply of the layup.

3. The method of claim 2, wherein:
    curing the first portion of the first ply of the layup includes heating the layup to a first temperature, and
    curing the uncured portion of the layup includes heating the layup to a second temperature higher than the first temperature.

4. The method of claim 1, wherein the layup includes at least one exposed ply of the layup located along the interfacial region for joining the layup to the composite piece of the composite structure.

5. The method of claim 1, wherein assembling the layup includes arranging the plies via aligning at least a section of the first ply with at least a section of the uncured portion of the layup.

6. The method of claim 1, further comprising the step of:
    forming the layup to a desired shape before curing a third uncured portion of the layup.

7. The method of claim 1, further comprising:
    applying a stabilizer to the resin curing accelerator.

8. The method of claim 1, wherein the resin comprises one of:
    epoxy resin;
    cynate ester resin;
    polyurethane resin; and
    phenolic resin.

9. The method of claim 1, wherein the plurality of plies comprise a thermoset prepreg ply.

10. The method of claim 1, wherein the plurality of plies comprise a ply comprising dry fiber plies; and comprising impregnating the dry fiber plies with a thermoset resin.

11. The method of claim 1, further comprising: joining the layup to the composite piece of the composite structure via one of: co-bonding, and co-curing.

12. The method of claim 1, further comprising applying the resin curing accelerator via an applicator associated with plies made from sheet material drawn from a bulk supply reel.

13. A process for joining, without using a supporting tool during the joining, composite parts comprising uncured portions, the process comprising:
    while laying up plies in a layup on a supporting tool for a first composite part, applying resin curing accelerator to portions, selected for pre-curing, of selected plies in the layup, the layup for the first composite part comprising an interfacial region comprising portions devoid of any resin curing accelerator;
    curing all portions selected for pre-curing of the layup for the first composite part comprising any resin curing accelerator;
    removing the layup for the first composite part from the supporting tool;

subsequent to removing the layup from the supporting tool, placing the interfacial region adjacent to a second composite part;

joining the layup for the first composite part and the second composite part while curing the interfacial region.

14. The process of claim 13, further comprising:
the second composite part comprising a second interfacial region comprising second portions devoid of any resin curing accelerator.

15. The process of claim 13, further comprising the selected plies comprising thermoset prepreg plies.

16. The process of claim 13, further comprising:
the selected plies comprising dry fiber plies; and
impregnating the dry fiber plies with a thermoset resin.

17. The process of claim 13, further comprising applying the resin curing accelerator via an applicator associated with plies made from sheet material drawn from a bulk supply reel.

\* \* \* \* \*